UNITED STATES PATENT OFFICE.

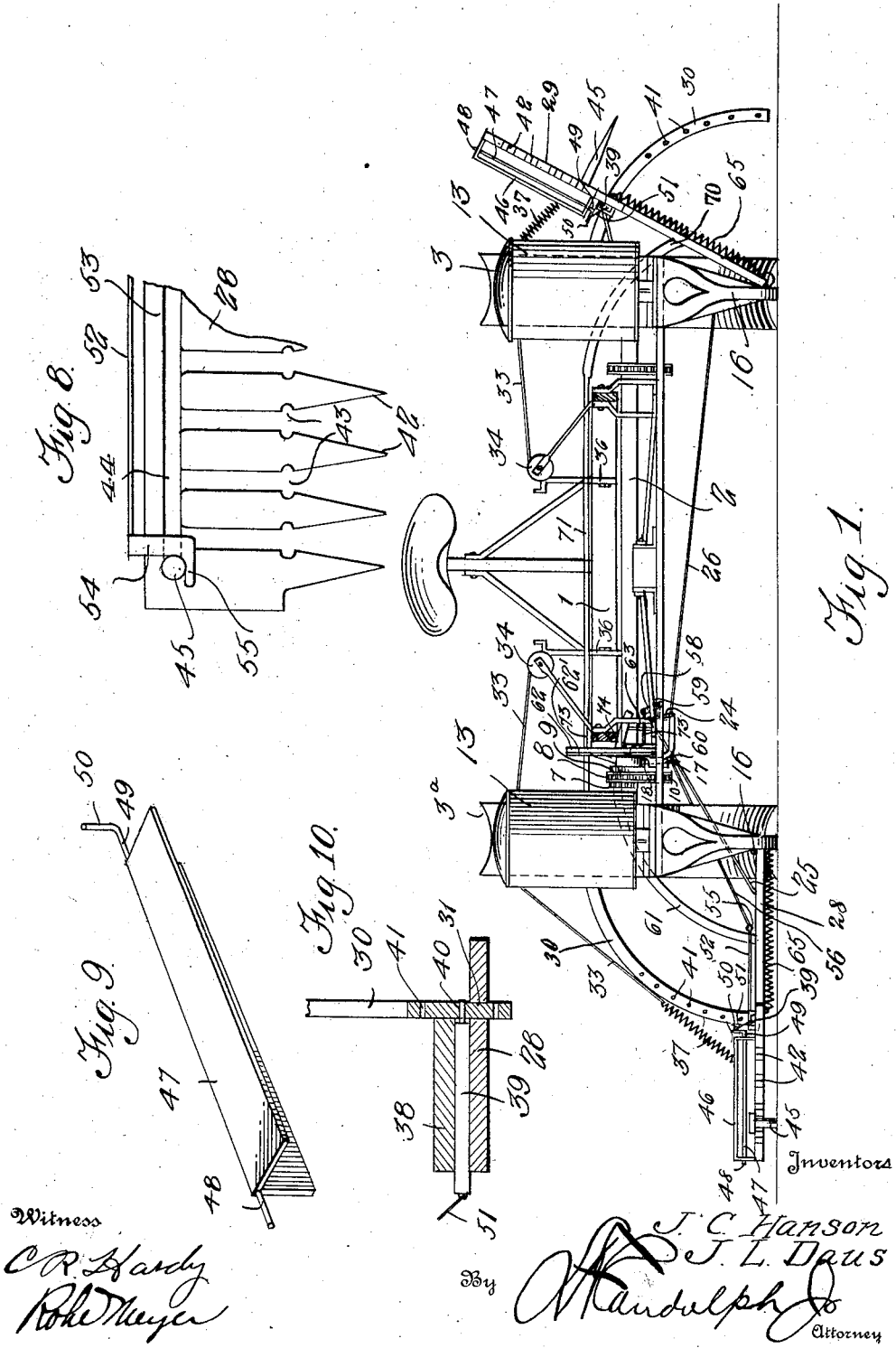

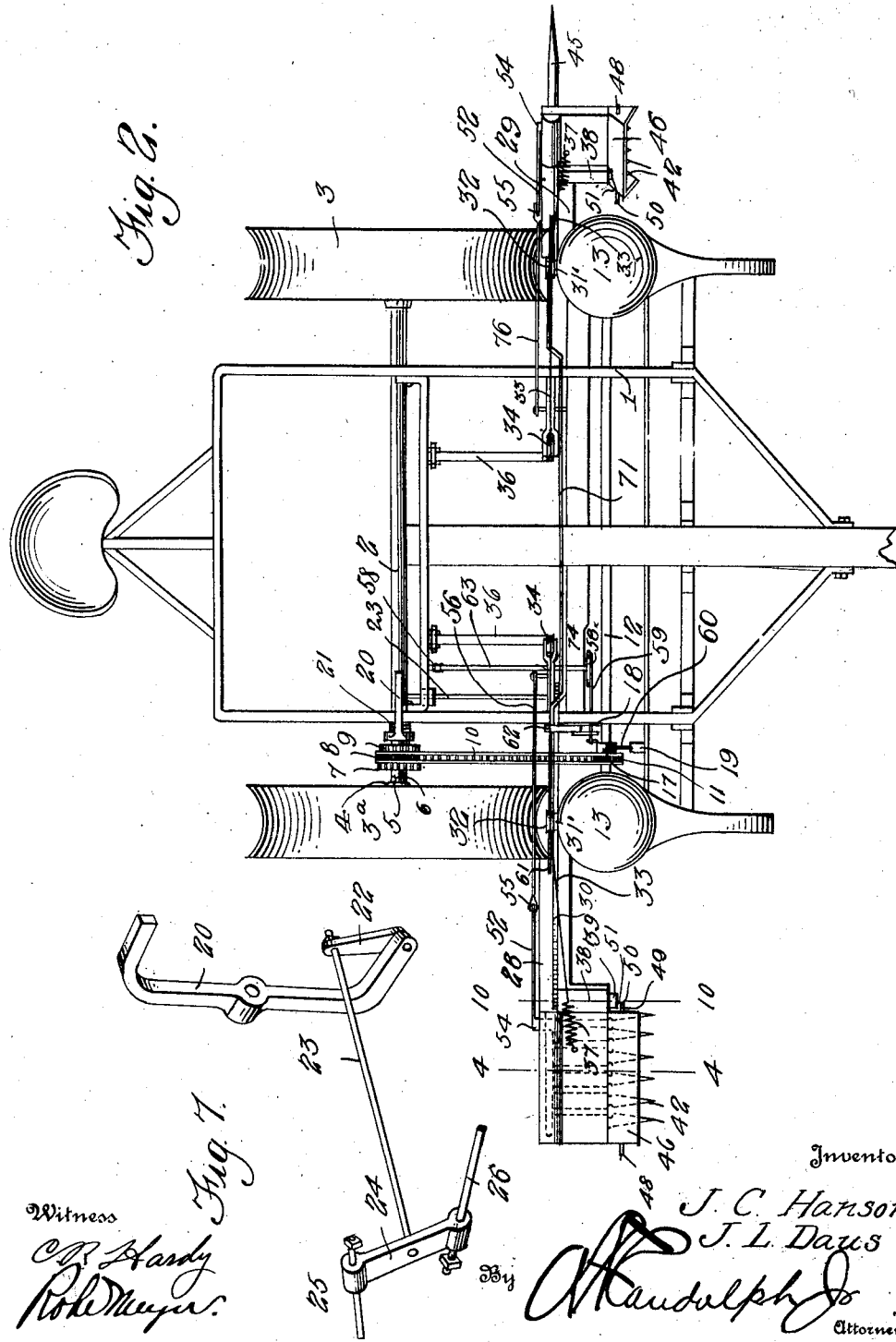

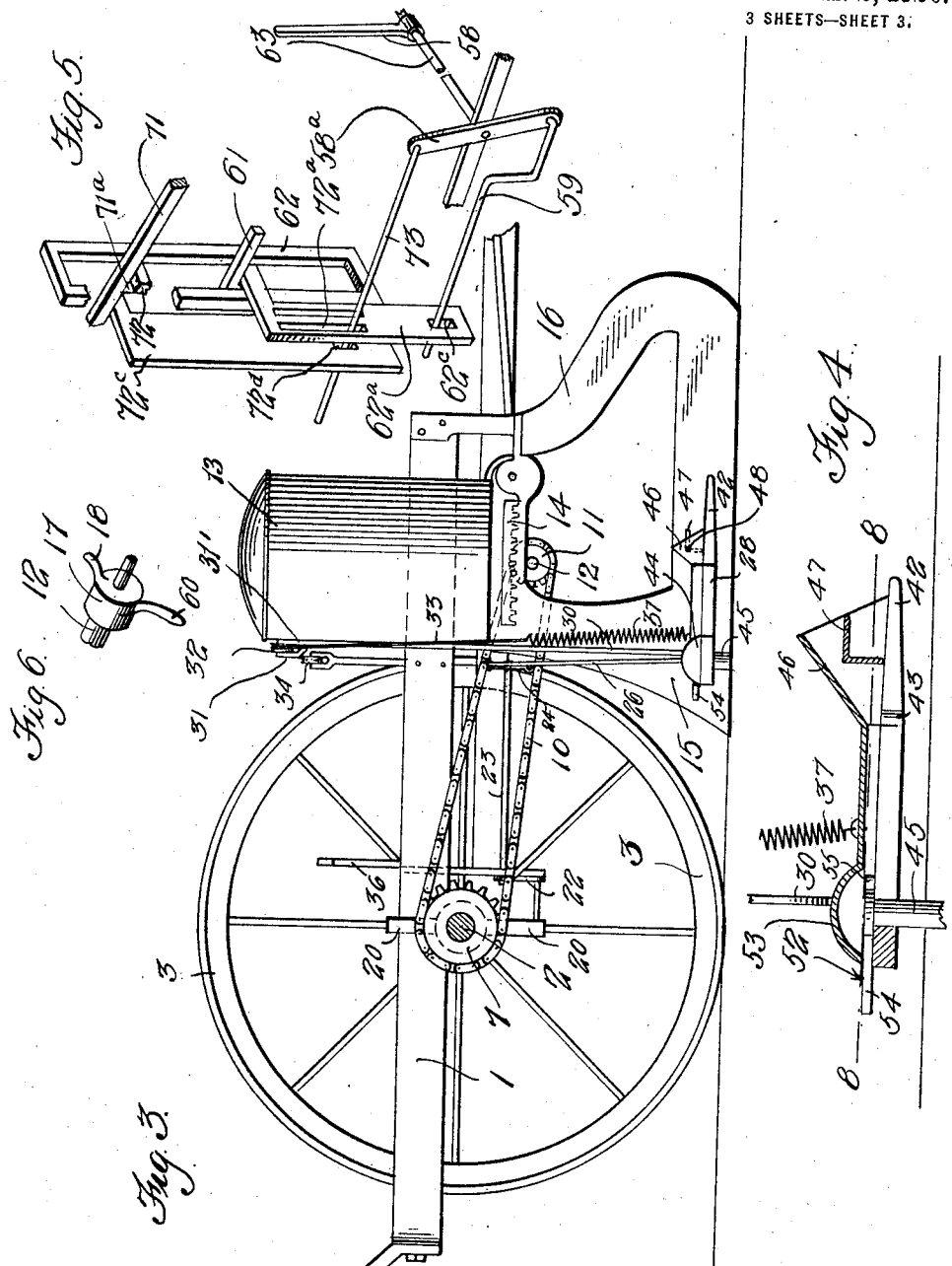

JOSEPH C. HANSON AND JOSEPH L. DAUS, OF MOVILLE, IOWA.

PLANTER.

1,332,830.

Specification of Letters Patent.

Patented Mar. 2, 1920.

Application filed May 29, 1917. Serial No. 171,718.

*To all whom it may concern:*

Be it known that we, JOSEPH C. HANSON and JOSEPH L. DAUS, citizens of the United States, residing at Moville, in the county of Woodbury and State of Iowa, have invented certain new and useful Improvements in Planters; and I do hereby declare the following to be a full, clear, and exact description of the invention, such as will enable others skilled in the art to which it appertains to make and use the same.

This invention relates to corn planters, and more particularly to a wireless check row corn planter.

The primary object of the invention is to provide a corn planter as specified, which includes means for planting corn in checked rows without necessitating the employment of the knotted wire usually employed for this purpose, and further to provide means whereby the distances between the hills of planted corn may be varied within certain limits as desired.

A still further object of this invention is to provide a corn planter as specified which includes means for starting the operation of the seed dropping mechanism at the beginning of a row, which means includes a rake structure which is adapted to pick up a pin deposited by a rake structure carried by the opposite side of the planter upon the termination of one row and means operated by the picking up of the pin by the rake structure for controlling the operation of the seed dispensing mechanism; and further to provide automatically operated means for assisting in moving the rake structure into a pin picking up and depositing position.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings wherein like characters designate like and corresponding parts throughout the several views and in which:—

Figure 1 is a front elevation of the improved corn planter;

Fig. 2 is a top plan view of the planter;

Fig. 3 is a side elevation of the planter;

Fig. 4 is a section on the line 4—4 of Fig. 2;

Fig. 5 is a detail perspective view of a part of the planter construction;

Fig. 6 is a detail perspective view of a member employed for operating the seed dropping mechanism;

Fig. 7 is a fragmentary perspective view of a part of the means for controlling the operation of the seed dispensing mechanism by movement of the rake structures;

Fig. 8 is a fragmentary horizontal section through the rake structure;

Fig. 9 is a detail perspective view of a member engaged by the pin when picked up by a rake structure for operating the means for holding the rake in a pin picking up position;

Fig. 10 is a section on the line 10—10 of Fig. 2.

Referring more particularly to the drawings, 1 designates the supporting frame of the planter, which carries a supporting axle 2, upon which the usual type of supporting wheels 3 and $3^a$ are mounted. The hub 4 of the supporting wheel $3^a$ has a clutch 5 formed thereon which is adapted for coaction with a clutch section 6. The clutch section 6 is slidably mounted upon the shaft 2, and it has a plurality of sprocket wheels 7, 8 and 9 carried thereby, which vary in size. A sprocket chain 10 passes about one of the sprockets 7, 8 or 9 and about a sprocket 11 which is carried by a shaft 12. The shaft 12 operates the seed dispensing mechanism 13 through the medium of the usual type of gears 14, for dropping the seed into the valve controlled delivery spout 15 of the planter shoes 16, from whence the seeds are deposited by the usual type of valve construction employed in planters of this nature for dropping the seeds in checked or spaced hills.

The sprockets 7, 8 and 9 are of different diameters so that when the chain 10 passes about them, it will regulate the dispensing of the seed from the seed dispensing mechanism 13.

The shaft 12 has a collar 17 mounted thereon which collar has formed thereon a finger 18. The finger 18 is provided for engaging a finger 19 for operating the shoe carried valves.

The collar 6 upon which the sprockets 7, 8 and 9 are mounted, has a forked member 20 connected thereto. A spiral spring 21 engages the member 20 and tends to hold the clutch section carried by the collar 6 in engagement with the clutch section 5 for rotating the sprockets by the rotation of the wheel 3ª.

The forked member 20 has an arm 22 connected thereto to which arm is connected a rod 23. The rod 23 is in turn connected to a member 24. The member 24 has rods 25 and 26 connected thereto. The rod 25 is connected to a rake structure 28 which is positioned upon one side of the planter, and the rod 26 is connected to a rake structure 29 which is positioned upon the opposite side of the planter from the rake structure 28. The rake structures 28 and 29 are hingedly connected to the supporting frame of the planter and arcuate guides 30 are provided which extend through openings 31 formed in the main bodies of the rakes for guiding the hinged movement of the rake structures.

The arcuate guiding arms 30 are formed upon standards 31' which are attached to and extend upwardly from the supporting frame of the planter. Pulleys 32 are carried by the upper ends of the standard 31' and cables or cords 33 extend over the pulleys 32, over pulleys 34 and are connected as shown at 35 to foot levers 36 which are positioned upon each side of the center of the planter. Springs 37 are connected to the free ends of the cords 33 and these springs are connected to the main bodies of the rakes 28 and 29. The cables or cords 33 and foot levers 36 are provided for stretching and tensioning the springs 37, for a purpose which will hereinafter more fully appear.

The rake bodies 28 have locking bolt structures 38 carried thereby which comprise sliding bolts 39 which have their inner ends reduced as shown at 40 and adapted for extending through any one of a series of openings 41 which are formed in the arcuate guides 30 for holding the rake structures in horizontal pin receiving positions, against the tension of the coil springs 65.

The outer ends of the rake structures are comparatively wide and are provided with a plurality of teeth 42 the inner ends of which lead to passageways 43 formed in the rake body. The passageways 43 extend parallel with the line of travel of the planter and their rear ends communicate with a transversely extending passageway 44 which extends across the width of the enlarged portion of the rake and is provided for delivering the marking pin 45 for positioning this pin in the ground. The enlarged portion of the body of the rake has upstanding plates 46 carried thereby which rockably support an angled member 47. The angled member 47 has pins 48 and 49 formed upon its end which extend through openings formed in the plates 46. The pin 49 has its terminal end angled as shown at 50. A cord 51 is connected to the angled end 50 and to the bolt 39 so that when the member 47 is rocked it will draw the bolt 39 outwardly for releasing connection between the rake structure and the guide 30.

A feeding plunger 52 is slidably carried by the enlarged portion of the rake structure and it travels in a trough or enlarged portion 53 which is formed along the back edge of the enlarged portion of the rake. The plunger 52 has an enlarged head 54 formed upon its outer end which is angled as clearly shown at 55 for engaging the pin 45 directly below the head of the pin, so that when the rake structure is moved into an upward substantially vertical position, the pin 45 will be forced longitudinally through the passageway 44 by the head 54 and the plunger 52. The plunger rod, is pivotally connected as shown at 55 to a rod 56. The rod 56 is connected in any suitable manner to the frame of the planter so that when the rake structure is moved into a substantially vertical position, the plunger head 54 will be moved outwardly in the trough 53 for forcing a pin 45 to the outer end of the passageway 44.

Coil springs 65 are connected to the rake structures 28 and 29 and to the planter frame for normally holding the rake structures in horizontal position and for throwing the rake structures forcibly downwardly, when the same are in their raised position for driving the pin 45 into the ground. The coil springs 65 are of greater strength than the coil springs 37, when the same are in their normal position.

The rake structures 28 and 29 are provided with arcuate arms 61 and 70 respectively, which are pivoted thereto and form means for holding the rake structures in their raised position, as will be hereinafter more fully described. The arm 70 is provided with a horizontal extension 71 which extends across the frame of the planter. The inner terminals of the arcuate arms 61 and 70 are slidably received in a vertical guide 62 rigidly carried by the frame of the machine and this guide includes a substantially rectangular frame having vertical cross pieces 72 upon which rest the terminals of the arcuate arms. Shoulders 71ª are formed on the arcuate arms and the same engage and catch the cross pieces 72 when the rake structures are in their raised position and the shoulders hold the rake structures in their raised position against the tension of the coil springs 65. Sliding plates 62ª and 72ᶜ are mounted on each side of the vertical guide 62 and the upper ends of the same are provided with projecting extensions 62ᵉ and 72ᵉ respectively, which form means for engaging the lower surfaces of the arcuate arms 61 and 70. It will be seen that when the plates 62ª and 72ᵇ are actuated the projections 62ᵉ and 72ᵉ will lift the arcuate arms 61 and 70 upwardly and thus carry the shoulders 71ª out of engagement with the cross pieces 72 and thereby release the arms and allow the rake structures 28 and 29 to be swung downwardly into horizontal position by the tension of the coil springs 65. A lever 58 is secured to the shaft 63 for manually rocking the shaft and the arm 58ª, which is carried by the same. Rods 59 and 73 are pivotally secured to the terminals of the arm 58 and upon suitable movement of the lever the arms can be actuated. The plate 62ª is provided with a slot 72ª in which is slidably received the arm 73 and this arm is projected through an aperture 72ᵈ formed in the plate 72ᶜ. By virtue of the slot 72ª, when the rod 73 is forced upwardly, by means, which will be hereinafter described, the plate 62ª will not be actuated, and only the plate 72ᶜ will be moved. The rod 59 is received in an aperture 62ᶜ in the plate 62ª and when the arm is forced upwardly the plate 62ª will be moved therewith.

In operation of the improved planter, one of the rake structures is normally in a raised position for delivering a pin while the other rake structure is in a horizontal position for picking up a pin.

When finishing a row of grain one of the foot pedals 36 is actuated, so as to stretch the coil springs 37 and thus increase the tension thereof, which will be sufficient to overcome the tension of the coil springs 65 and thus when the locking bolt structure 39 is released from the arcuate guide 30 the rake will be forced upwardly. The other foot pedal 36 is operated so as to loosen the other coil spring 37, so that the coil spring 65 will tend to throw the same downwardly when the arcuate arm 61 is released. The lever 58 is then actuated in a suitable direction which will rock the shaft 63 and the arm 58ª, which moves either the rod 59 or the rod 73 according to the movement of the lever into the path of the arms or fingers 60 or 18, which are formed upon the collar 17. The rotation of the collar 17 will actuate the rods or fingers 59 or 73 as the case might be, which will move the plate 72ᶜ or plate 62 upward and thus lift the arms 71 or 61 out of engagement with the cross pieces 72 and lift the shoulders 71ª formed on the terminals of the arcuate arm 61 out of engagement with the cross pieces 72 and allow the same to come out of engagement with the cross pieces and thus allow either the rake structures 28 or 29, as the case might be, to be forcibly swung downward by means of the coil springs 65 toward the ground, which will drive the pin 45 into the ground.

The rake structure 28 or 29, which has been moved downwardly will remain in horizontal position through the virtue of the lock bolt 39. When the rake structure is moved downwardly, it will consequently move the rod 26, which is connected thereto and the movement of this rod will actuate the rod 23. The actuation of the rod 23 will move the cross member 20 against the tension of the spring 21 and move the clutch section 6 out of engagement with the clutch section 5, and thereby arrest the operation of the seed dispensing mechanism. The operation is then started in the manner hereinafter more fully described.

As stated above the rake structure will remain in horizontal position.

The rake structure 28 will remain in horizontal position, and the clutch sections disconnected until the planter has been turned for starting back to plant the next row or pair of rows of grain. When the planter is returning from planting the next row of grain, the rake structure will pick up the pin 45 between a pair of the teeth, and the forward movement of the planter will cause the rake structure to pass along the pin until the head of the same engages the depending side of the angular plate 47. The forward movement of the planter will then rock the angled member 47 and rock the angled end 50 which will pull the bolt 39 out of the opening 41 and permit the rake structure to be moved into a substantially vertical position. The rocking movement of the angled member 47 will cause the side which normally lies in a horizontal plane, to strike the head of the pin 45 and move it into the passageway 43 which communicates with the space between the two teeth that picked up the pin. The pin will then travel rearwardly into the transversely extending passageway 44 where it will be engaged by the plunger 54 and carried to the outer end of the rake ready to be deposited into the ground upon the next downward stroke of the rake structure. The upward movement of the rake structure into a substantially vertical position, will move the rod 23, and consequently move the member 20, allowing the spring 21 to move the clutch section 6 into engagement with the clutch section 5, which will start the rotation of the sprockets 7, 8 and 9 by the rotation of the wheel 3ª and consequently start the operation of the seed dispensing mechanism so that the first hill of seed or grain planted will be in alinement with the last hill of the row previously planted.

From the foregoing description taken in connection with the accompanying drawings, the advantages of construction and of the method of operation of the improved planter, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a corn planter structure, the combination of a supporting axle, seed dispensing means, means operated by the travel of the planter for operating said seed dispensing mechanism, a marking pin, a pick up rake for said pin, and means controlled by the picking up of the pin by said rake for controlling the operation of said seed dispensing mechanism.

2. In a corn planter structure, the combination, of a supporting axle, supporting wheels mounted upon said axle, seed dispensing mechanism, means operated by the rotation of one of said supporting wheels for operating said seed dispensing mechanism, a marking pin, a pick up rake structure carried by the planter, and means operable by the marking pin when picked up by the rake structure for controlling the operation of said seed dispensing mechanism.

3. In a corn planter structure, the combination, of a supporting axle, supporting wheels mounted upon said axle, seed dispensing mechanism, means operated by the rotation of one of said supporting wheels for operating said seed dispensing mechanism, a marking pin, a pick up rake structure carried by the planter, means operable by the marking pin when picked up by the rake structure for controlling the operation of said seed dispensing mechanism, and means for regulating the speed of operation of said dispensing mechanism.

4. In a corn planter structure, the combination, of a supporting axle, supporting wheels mounted upon said axle, seed dispensing mechanism, means operated by the rotation of one of said supporting wheels, for operating said seed dispensing mechanism, a marking pin, a pick up rake structure carried by the planter, means operable by the marking pin when picked up by the rake structure for controlling the operation of said seed dispensing mechanism, a plunger carried by said rake structure and adapted for forcing the marking pin into a depositing position whereby the pin will be driven into the ground upon downward movement of the rake structure.

5. In a corn planter structure, the combination, of a supporting axle, supporting wheels mounted upon said axle, seed dispensing mechanism, means operated by the rotation of one of said supporting wheels for operating said seed dispensing mechanism, a marking pin, a pick up rake structure carried by the planter, means operable by the marking pin when picked up by the rake structure for controlling the operation of said seed dispensing mechanism, a plunger carried by said rake structure and adapted for forcing the marking pin into a depositing position whereby the pin will be driven into the ground upon downward movement of the rake structure, and means for holding the rake structure in a downward pin receiving position.

6. In a corn planter structure, the combination, of a supporting axle, supporting wheels mounted upon said axle, seed dispensing mechanism, means operated by the rotation of one of said supporting wheels for operating said seed dispensing mechanism, a marking pin, a pick up rake structure carried by the planter, means operable by the marking pin when picked up by the rake structure for controlling the operation of said seed dispensing mechanism, a plunger carried by said rake structure and adapted for forcing the marking pin into a depositing position whereby the pin will be driven into the ground upon downward movement of the rake structure, means for holding the rake structure in a downward pin receiving position, an angle plate rockably carried by the rake structure, and means connected to said angle plate and said locking means whereby the locking means will be released by the rocking of said plate under engagement with the marking pin.

7. In a corn planter structure, the combination, of a supporting axle, supporting wheels mounted upon said axle, seed dispensing mechanism, means operated by the rotation of one of said supporting wheels for operating said seed dispensing mechanism, a marking pin, a pick up rake structure carried by the planter, means operable by the marking pin when picked up by the rake structure for controlling the operation of said seed dispensing mechanism, a plunger carried by said rake structure and adapted for forcing the marking pin into a depositing position whereby the pin will be driven into the ground upon downward movement of the rake structure, means for holding the rake structure in a downward pin receiving position, an angle plate rockably carried by the rake structure, means connected to said angle plate and said locking means whereby the locking means will be released by the rocking of said plate under engagement with the marking pin, and means for varying the speed of operation of said dispensing mechanism.

In testimony whereof we affix our signatures in presence of two witnesses.

JOSEPH C. HANSON.
JOSEPH L. DAUS.

Witnesses:
GEORGE F. BOSWORTH,
F. J. MCGAFFIN,